(12) United States Patent
Kim et al.

(10) Patent No.: US 8,895,144 B2
(45) Date of Patent: Nov. 25, 2014

(54) MULTIFUNCTIONAL THERMAL CONDUCTING AND/OR RADIATING PARTICLES AND ARRAY HAVING THE SAME, AND FABRICATION METHOD THEREOF

(75) Inventors: Sang Woo Kim, Seoul (KR); Seon Young Moon, Gyeongsangnam-Do (KR)

(73) Assignee: Korea Institute of Science and Technology, Seoul (KR)

( * ) Notice: Subject to any disclaimer, the term of this patent is extended or adjusted under 35 U.S.C. 154(b) by 85 days.

(21) Appl. No.: 13/278,880

(22) Filed: Oct. 21, 2011

(65) Prior Publication Data

US 2012/0313032 A1 Dec. 13, 2012

(30) Foreign Application Priority Data

Nov. 12, 2010 (KR) ........................ 10-2010-0112647

(51) Int. Cl.
*B32B 5/16* (2006.01)

(52) U.S. Cl.
USPC ........... 428/403; 428/323; 428/327; 428/328; 428/402; 428/407

(58) Field of Classification Search
USPC ................. 428/403, 402, 407, 328, 327, 323; 977/784, 832
See application file for complete search history.

(56) References Cited

U.S. PATENT DOCUMENTS

| 7,030,172 | B2 * | 4/2006 | Sakurai ........................ 523/137 |
| 7,560,160 | B2 * | 7/2009 | Sudarshan et al. ............ 428/402 |
| 7,919,184 | B2 * | 4/2011 | Mohapatra et al. ....... 428/402.24 |
| 8,465,663 | B2 * | 6/2013 | Kato et al. ................. 252/62.54 |

FOREIGN PATENT DOCUMENTS

| EP | 1 372 162 A1 | 12/2003 |
| JP | 2006-135118 A | 5/2006 |
| JP | 2007-031695 A | 2/2007 |

* cited by examiner

*Primary Examiner* — Leszek Kiliman
(74) *Attorney, Agent, or Firm* — Ladas & Parry LLP

(57) ABSTRACT

Disclosed are a multifunctional thermal conducting and/or radiating particle simultaneously having at least one of various functions, such as electromagnetic wave absorbing property, flame retardancy, antistatic property, insulating property, thermal resistance and electrical conductivity, as well as a thermal conductivity, a composite array having the same and a fabrication method thereof. The multifunctional thermal conducting and/or radiating particle is composed of a core and a shell, wherein the core includes a core particle having a lower thermal conductivity than that of a particle included in the shell, and the shell includes high-thermal conductive particles each having a higher thermal conductivity than that of the core particle.

15 Claims, 16 Drawing Sheets

MULTIFUNCTIONAL THERMAL CONDUCTING AND/OR RADIATING PARTICLES AND ARRAY HAVING THE SAME, AND FABRICATION METHOD THEREOF

CROSS-REFERENCE TO RELATED APPLICATION

Pursuant to 35 U.S.C. §119(a), this application claims the benefit of earlier filing date and right of priority to Korean Application No. 10-2010-0112647, filed on Nov. 12, 2010, the contents of which is incorporated by reference herein in its entirety.

BACKGROUND OF THE INVENTION

1. Field of the Invention

This specification relates to multifunctional thermal conducting and/or radiating particles and an array having the same, and more particularly, multifunctional thermal conducting and/or radiating particles having not only thermal conductivity but also at least one of various properties, such as electromagnetic wave absorbing property, flame retardency, antistatic property, insulating property, thermal resistance, electrical conductivity and the like, an array having the same and a fabrication method thereof.

2. Background of the Invention

As specific devices, such as flat panel display devices, flexible devices, LEDs, vehicle packages, small-sized electronic devices and information communication devices, become thin in thickness and integrated, countermeasures against heat, electromagnetic waves and the like are being at issue. Especially, a processing speed of a microprocessor as a logical chip device is getting fast up to several GHz, and a memory semiconductor highly increases in capacity up to almost terabit. Accordingly, thermal density is further increased and emission of electromagnetic waves are drastically increased, thereby affecting or being affected by adjacent electronic components or the device itself to cause an electromagnetic interference (EMI/EMC) and thermal aging. Hence, it is urgent to prepare countermeasures against such heat, electromagnetic waves and the like in the latest devices. To solve the thermal problems generated from electronic components or electronic component modules, a heat sink is widely used. The heat sink is attached onto an electronic module acting as a heat source to fast disperse (spread) generated heat to the exterior. When the heat sink is physically attached onto such electronic component, the attached surface is not flat and thereby a gap may be generated therebetween, thereby causing an inefficient heat transfer. In regard of this, to lower thermal resistance at a contact part, a flexible film or a greasy thermal interface material (TIM) is interposed therebetween. Also, the heat sink emits high heat in a high power LED package and the like, complex functions (properties) such as thermal resistance, flame retardency and the like are also required.

However, the conventional TIM has been designed for the purpose of facilitating heat transfer between the electronic component and the heat sink, so it has not had a function of removing radiation noise generated from the inside of an electronic device or electrical noise introduced from the outside.

For preventing noise interference in the related art, electromagnetic waves, which are emitted from the electronic components or introduced from the outside, was blocked by covering the electronic components or blocking a gap using a shielding case, a conductive sheet, a conductive fiber, a conductive gasket, a conductive paste and the like, those formed of a conductive metal (e.g., silver, copper, etc.). Those materials are mainly made of the conductive metal, thus to exhibit superior thermal radiating properties. However, for packaging with electronic components by applying those materials, an electric shock may be caused due to low withstand voltages. Consequently, they are inappropriate as TIM material unless an electrically insulating layer is further inserted.

An electromagnetic wave shielding/absorbing material (JP 2006-135118 A1), which is formed by laminating the electromagnetic wave absorbers, fabricated in the related art in a sheet form, or electromagnetic wave absorbers and conductive shielding materials in a multi-layered structure, exhibits high electromagnetic wave shielding effect but has difficulty in effectively dispersing (spreading, dissipating) heat. In order to satisfy various functions required in electric/electronic devices, various functional materials should be inserted, however, they may not effectively cope with the recent tendency of being thin in thickness. In recent years, several methods have been introduced in which multifunctional thermal radiating materials simultaneously having different functions (properties), such as electromagnetic wave absorbing properties, electrically insulating property, thermal resistance, flame retardency and the like so as to acquire spatial and economical advantages.

As one example, for simultaneous exhibition of electromagnetic wave absorbing property and thermal conductivity, a method, in which magnetic powders and high conductive ceramic powders are mixed with a polymer binder using a typical agitator, followed by extrusion or tape-casting, thereby fabricating a powder composite in a sheet form, has been filed in Europe (EP 1372162A1), Japan (JP 2007-31695) and USA (U.S. Pat. No. 7,030,172 B2). However, upon requirements of two or more functionalities, an appropriate means for formation of a heat transfer path between thermal conductors is not found, for example, in a multifunctional array (structure) using both a filler having relatively low thermal conductivity and a filler having high-thermal conductivity, the fillers having different functions.

SUMMARY OF THE INVENTION

For an electromagnetic wave absorbable thermal radiating composite, in which an electromagnetic wave absorber is merely physically mixed with a thermal conductor (conductive material) to provide multifunction, the performance of each property is low to cause difficulty in reducing a size. To overcome such problem, a multifunctional thermal conducting and/or radiating material, which simultaneously has functionalities, such as electromagnetic wave absorbing property and the like, as well as thermal radiating property and also exhibits high efficiencies than the related art properties, is required.

For example, a thermal resistant polymer composing a matrix is required to have high thermal conductivity and high thermal resistance. The thermal resistant polymer generally has low thermal conductivity. To improve the thermal conductivity of the composite, increasing the thermal conductivity of a polymer matrix is preferred the most. However, since there is no commercialized thermal resistant polymer with high thermal conductivity, which has economical merits, it is more appropriate to lower thermal resistance of a charging structure than to improve the thermal conductivity from the matrix. To this end, the present invention provides a method for forming a heat transfer path between high thermal conductive media in a composite array (structure) having one or two or more of electromagnetic wave absorbing property, flame retardency, antistatic property, insulating property, thermal resistance and electrical conductivity, especially, in a multifunctional array (structure) for implementing two functions of electromagnetic wave absorbing property and thermal conducting and/or radiating property at the same time.

Therefore, an aspect of the detailed description is a multifunctional thermal conducting and/or radiating particle composed of a core including a core particle having lower thermal conductivity than that of a particle included in a shell, and a shell including high-thermal conductive particles having high thermal conductivity than that of the core particle, a composite array (structure) formed by a mass of the multifunctional thermal conducting and/or radiating particles, and a composite film including the multifunctional thermal conducting and/or radiating particles or the composite array, and an organic binder.

Another aspect of the detailed description is to provide a method for fabricating a multifunctional thermal conducting and/or radiating particle composed of a core and shell, the method including mixing a core particle having lower thermal conductivity than that of each particle included in the shell with high-thermal conductive particles each having higher thermal conductivity than that of the core particle, and binding the high-thermal conductive particles onto the surface of the core particle to create the shell.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Effect of the Invention

The multifunctional thermal conducting and/or radiating material fabricated by the method can have at least one of functions, such as electromagnetic wave absorbing property, flame retardency, antistatic property, insulating property, thermal resistance and electrical conductivity, as well as thermal conductivity. An array containing the multifunctional thermal conducting and/or radiating materials can be mixed with a polymer organic binder such as silicon, epoxy, etc., to be into a form of a multifunctional thermal conducting and/or radiating film, master batch or three-dimensional array, resulting in creating a multifunctional thermal conducting and/or radiating material having at least one of electromagnetic wave absorbing property, flame retardency, antistatic property, insulating property, thermal resistance and electrical conductivity.

A material having high thermal conductivity may be strongly bound to a functional material, which is made of metal, ceramic, plastic or the like and has at least one function, in a mechanical of chemical bonding manner, thus to fabricate a multifunctional high thermal conducting and/or radiating material, thereby simultaneously implementing at least one of electromagnetic wave absorbing property, flame retardency, antistatic property, insulating property, thermal resistance and electrical conductivity as well as thermal conductivity, even with thin thickness or less volume. Also, the high thermal conducting and/or radiating material having such multifunctionalities can be applied to allow transferring of heat to a heat sink or the like more efficiently than the integrally laminated multifunctional thermal radiating material of the related art, resulting in effective use as a thermal conducting and/or radiating material of electric/electronic devices, displays, digital communication devices and the like, which requires light weight and small size.

Also, such multifunctional thermal conducting and/or radiating material can be used to absorb or shield static electricity or shield electromagnetic waves introduced from the exterior in addition to absorbing electromagnetic waves generated from electrical components, thereby allowing those electric components to be stably operated. In addition, the multifunctional thermal conducting and/or radiating material processed into a form of film or gasket can be inserted between an electric component and a heat sink for thermal radiation for adhesion or sealing therebetween and also be allowed to have high thermal resistance and flexibility so as to exhibit a high heat transfer property even at high temperature. Especially, a three-dimensional (3D) composite array processed into various shapes through injection molding, near net shaping and the like can be applied even to a multifunctional heat sink having high thermal conductivity.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
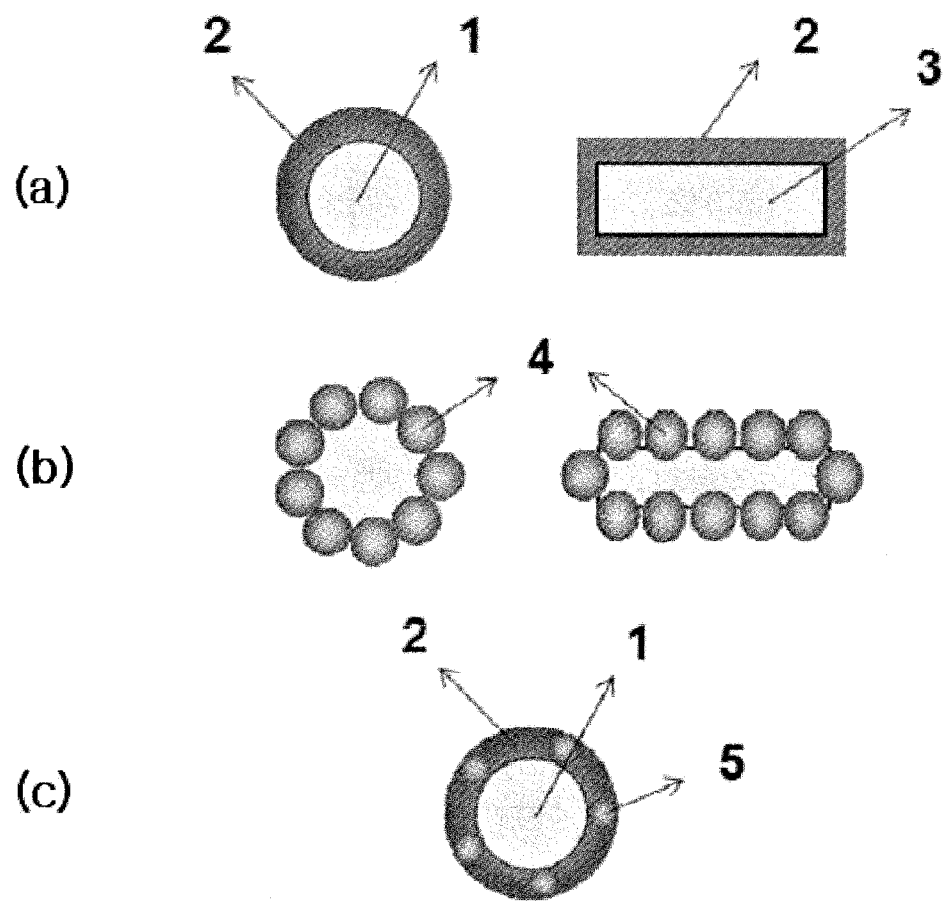
FIG. 1 is a mimetic diagram of multifunctional thermal conducting and/or radiating particles in various shapes in accordance with the present disclosure.

A multifunctional thermal conducting and/or radiating particle according to this specification may be composed of a core and a shell. The core may include a core particle having thermal conductivity lower than that of a particle included in the shell, and the shell may include high-thermal conductive particles each having thermal conductivity higher than that of the core particle (see FIG. 1).

The shell may be 5~60 volume % of the core, and a diameter of the core may correspond to 50~90% of a diameter of a whole multifunctional thermal conducting and/or radiating particle. The core may have at least one shape selected from a group consisting of a plate-like shape, a spherical shape, a needle-like shape and a granular shape (see FIGS. 1A and 1B).

The core particle may be a particle formed of at least one selected from a group consisting of metal, ceramic and plastic, and be a particle having at least one property selected from a group consisting of electromagnetic wave absorbing property, flame retardency, antistatic property, insulating property, thermal resistance and thermal conductivity. The core particle having the electromagnetic wave absorbing property may be at least one functional particle selected from a group consisting of magnetic alloy, thermal magnetic ceramic, ferrite and conductive polymer.

The shell may further include thermal conductive seeds or high-thermal conductive ultrafine particles (see FIG. 1C).

The shell may be a coated layer containing the high-thermal conductive particles (see FIG. 1A), or a single layer composed of the high-thermal conductive particles (see FIG. 1B).

Figure 2:
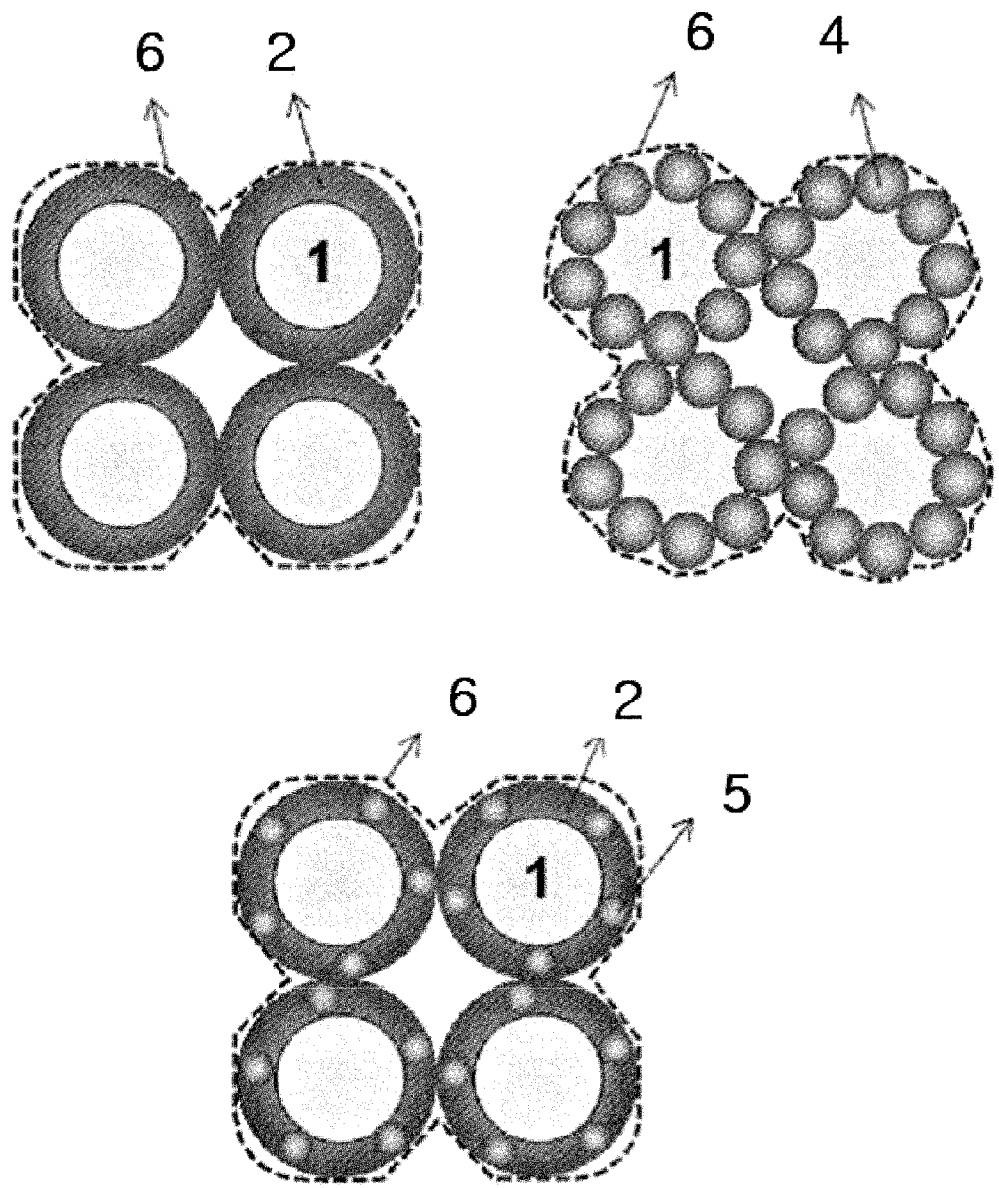
FIG. 2 is a mimetic diagram of composite arrays in various shapes in accordance with the present disclosure.

The composite array (structure) according to this specification may be formed by massing the multifunctional thermal conducting and/or radiating particles (see FIG. 2). Alternatively, the composite array may be formed as the multifunctional thermal conducting and/or radiating particles are massed together by themselves or a mass thereof is induced by addition of binder.

Figure 3:
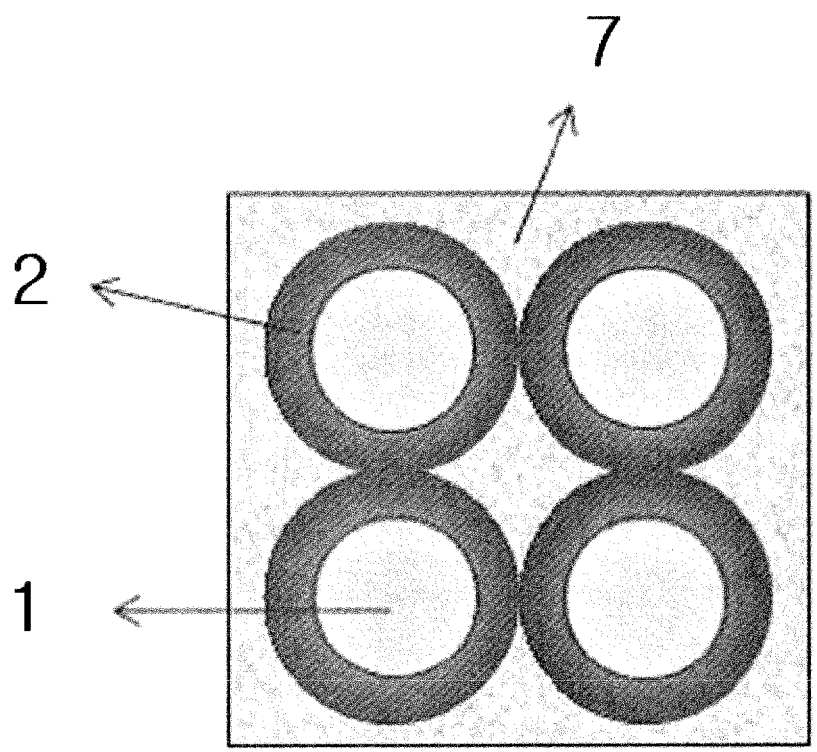
FIG. 3 is a mimetic diagram of a composite film including the multifunctional thermal conducting and/or radiating particles.
Figure 9:
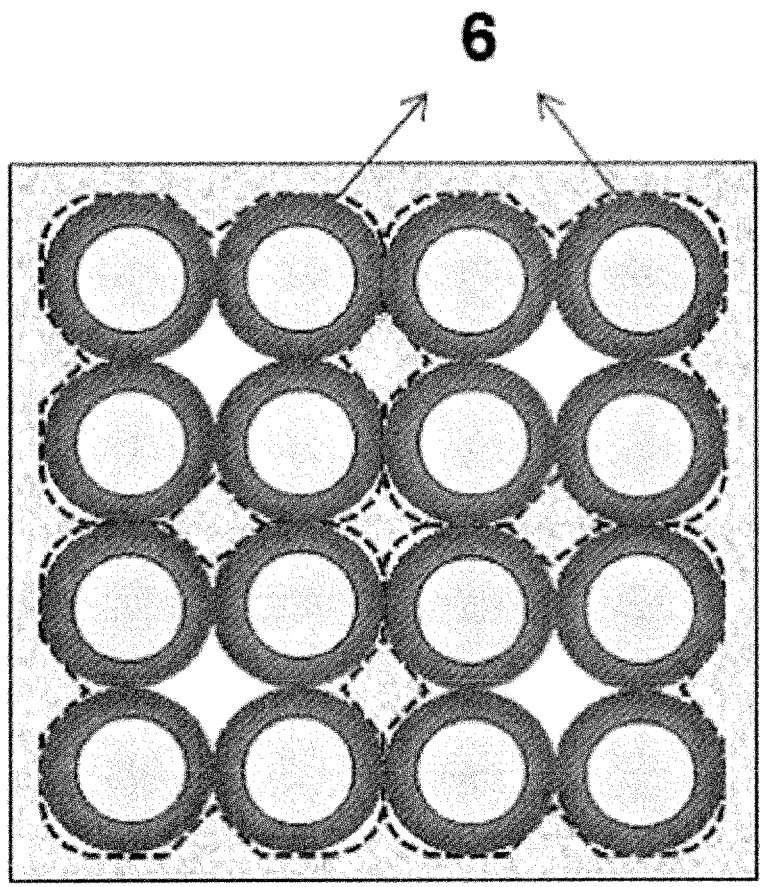
FIG. 9 is a mimetic diagram of a composite film having a composite array (structure) according to the present disclosure.
Figure 10:
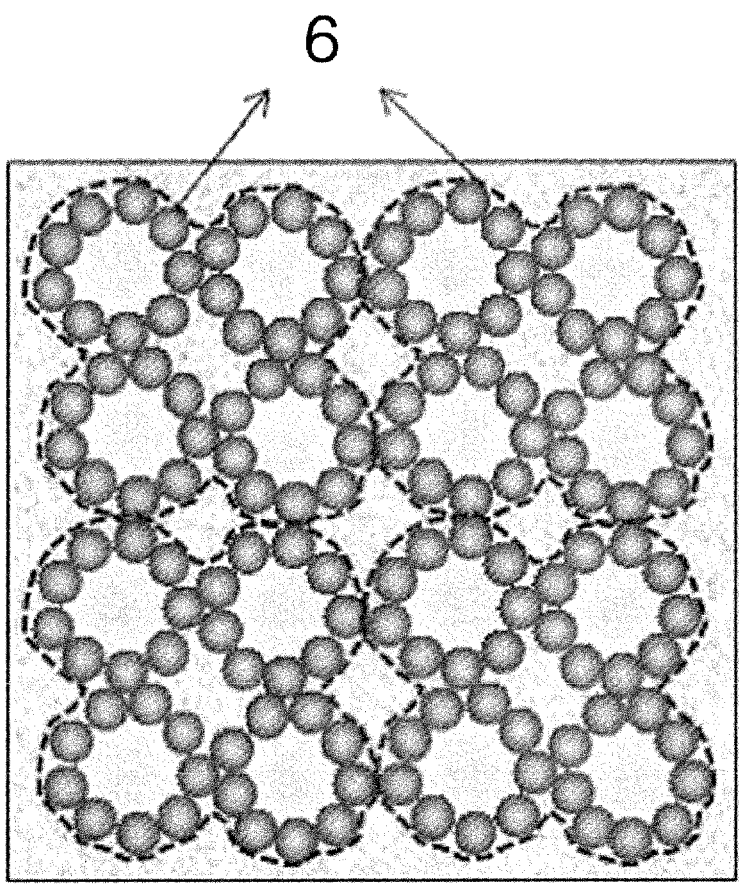
FIG. 10 is a mimetic diagram of a composite film having composite arrays each including multifunctional thermal conducting and/or radiating particles with a single-layered shell.
Figure 11:
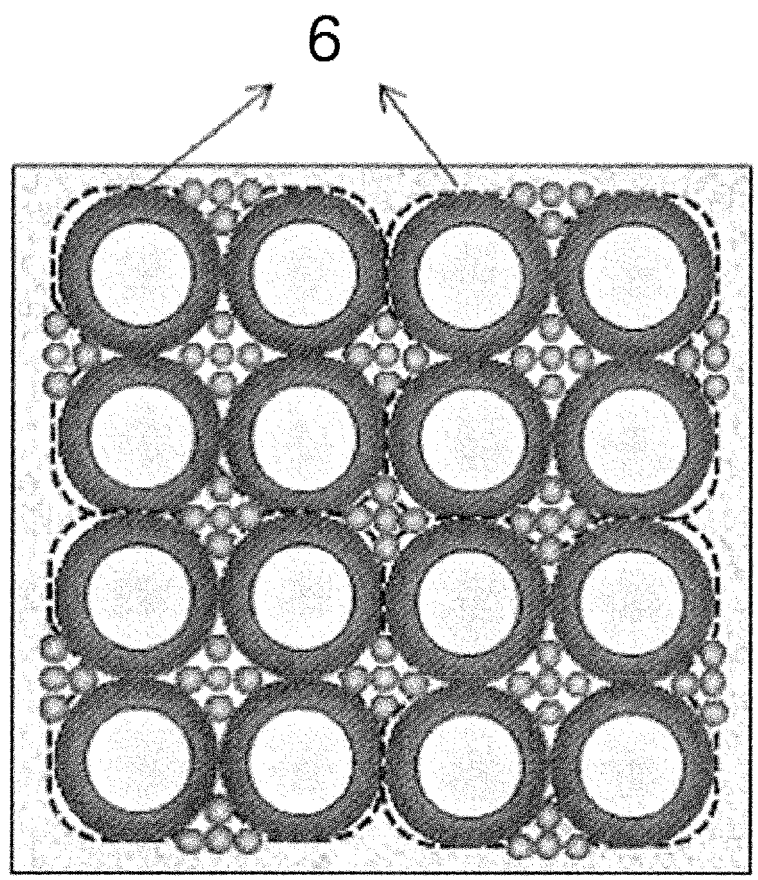
FIG. 11 is a mimetic diagram of a composite film having composite arrays further including thermal conductive particles each having a micro size or less.
Figure 12:
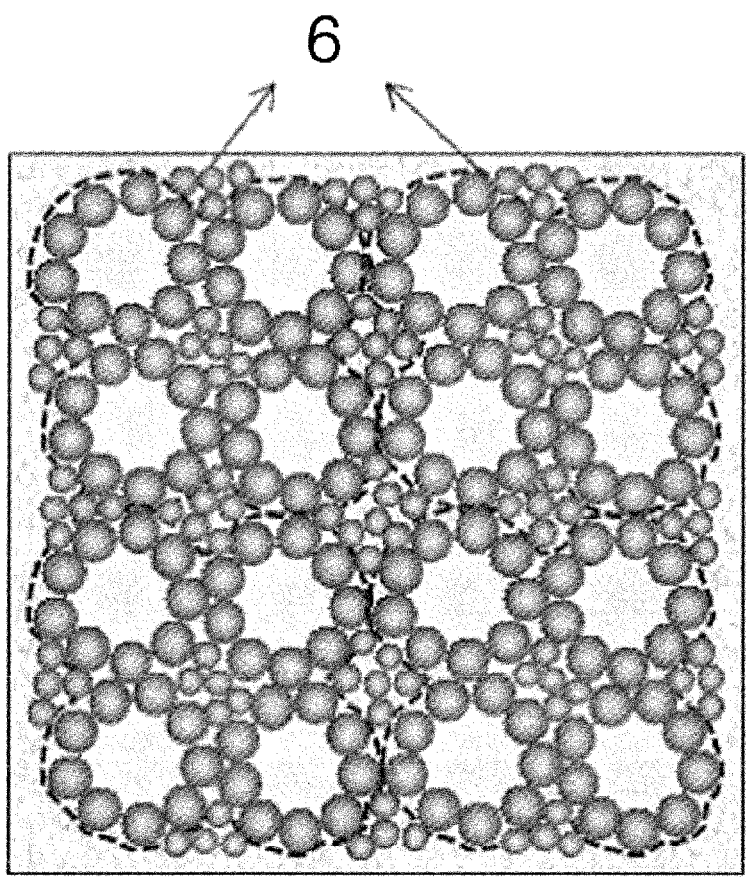
FIG. 12 is a mimetic diagram of a composite film including composite arrays each including multifunctional thermal conducting and/or radiating particles with a single-layered shell, and heat conductive particles each having a micro size or less.
Figure 13:
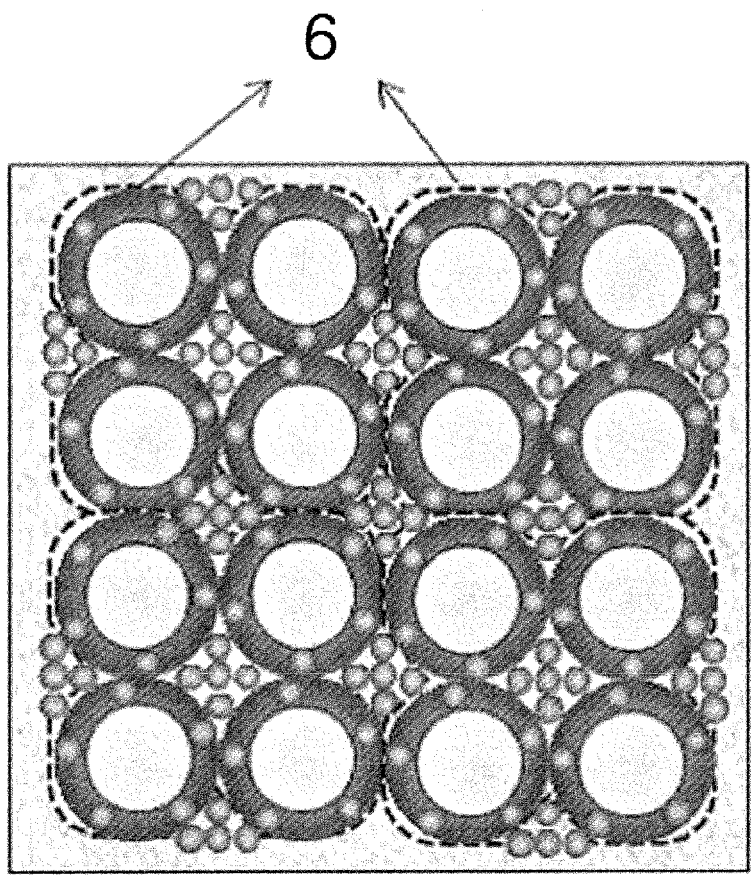
FIG. 13 is a mimetic diagram of a composite film having composite arrays each including multifunctional thermal conducting and/or radiating particles, which further contain thermal conductive seeds or high-thermal conductive ultrafine particles in a shell, and heat conductive particles each having a micro size or less.

The composite film according to this specification may include the multifunctional thermal conducting and/or radiating particles, the composite arrays and an organic binder (see FIGS. 3 and 9). Alternatively, the composite film may include only the multifunctional thermal conducting and/or radiating particles and the organic binder, include only the composite arrays and the organic binder, or include all of the multifunctional thermal conducting and/or radiating particles, the composite arrays and the organic binder.

Figure 4:
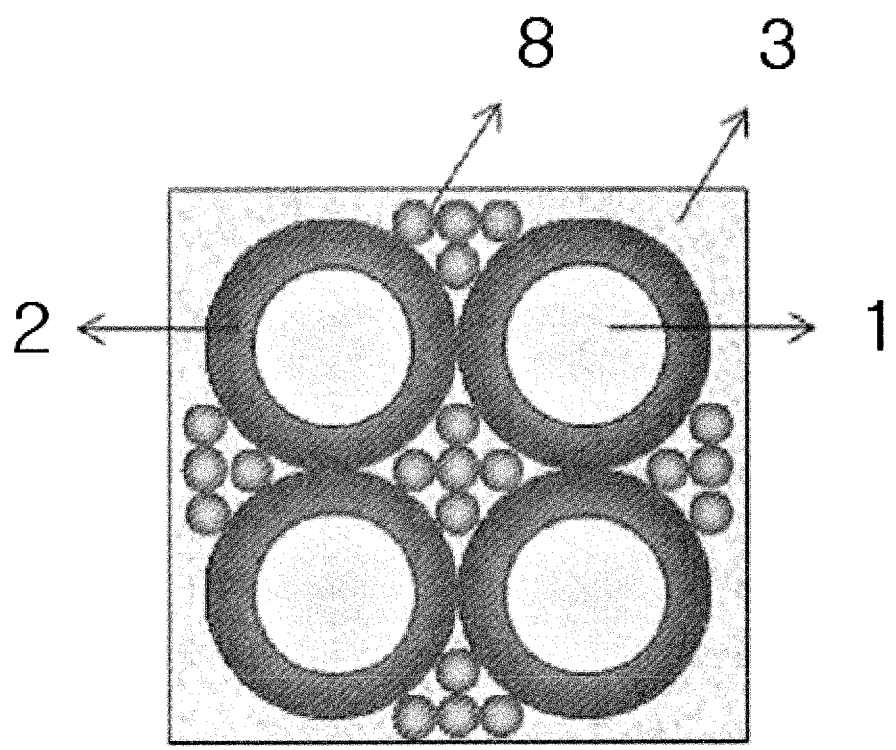
FIG. 4 is a mimetic diagram of the composite film further including thermal conductive particles having a micro size or less.
Figure 5:
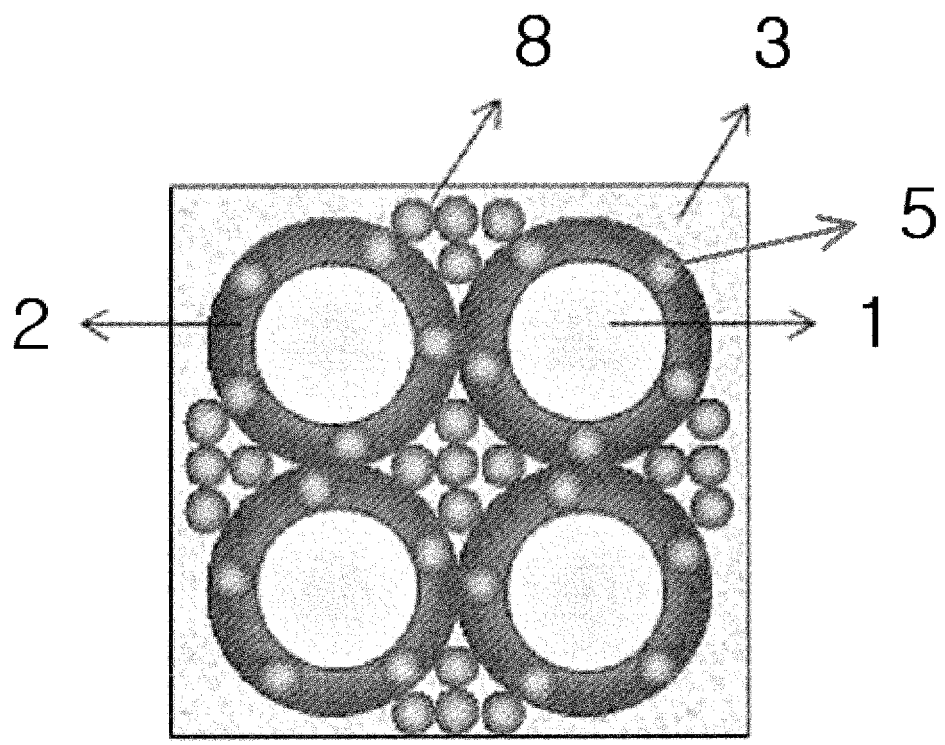
FIG. 5 is a mimetic diagram of a composite film including multifunctional thermal conducting and/or radiating particles, each further containing thermal conductive seeds or high-thermal conductive ultrafine particles in its shell.
Figure 6:
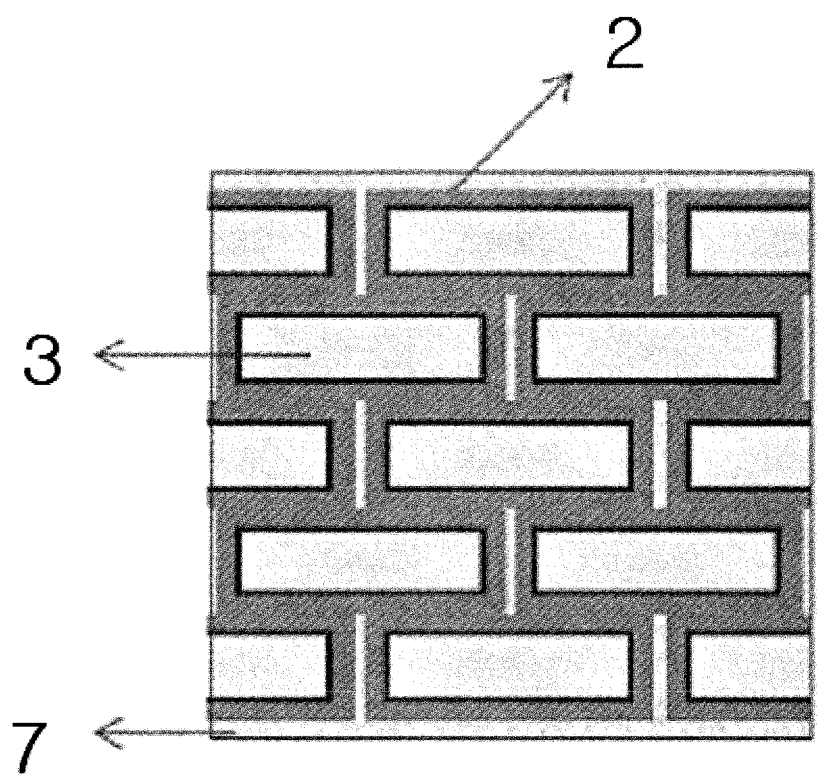
FIG. 6 is a mimetic diagram of a composite film including multifunctional thermal conducting and/or radiating particles with a single-layered shell.
Figure 7:
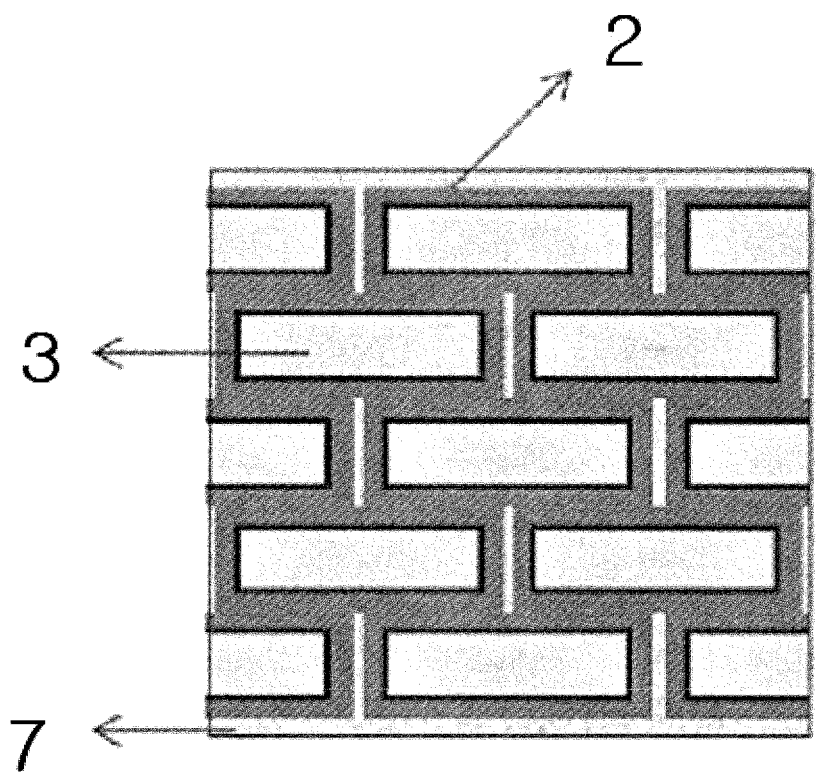
FIG. 7 is a mimetic diagram of an exemplary composite film including multifunctional thermal conducting and/or radiating particles, each having a plate-like core particle.
Figure 8:
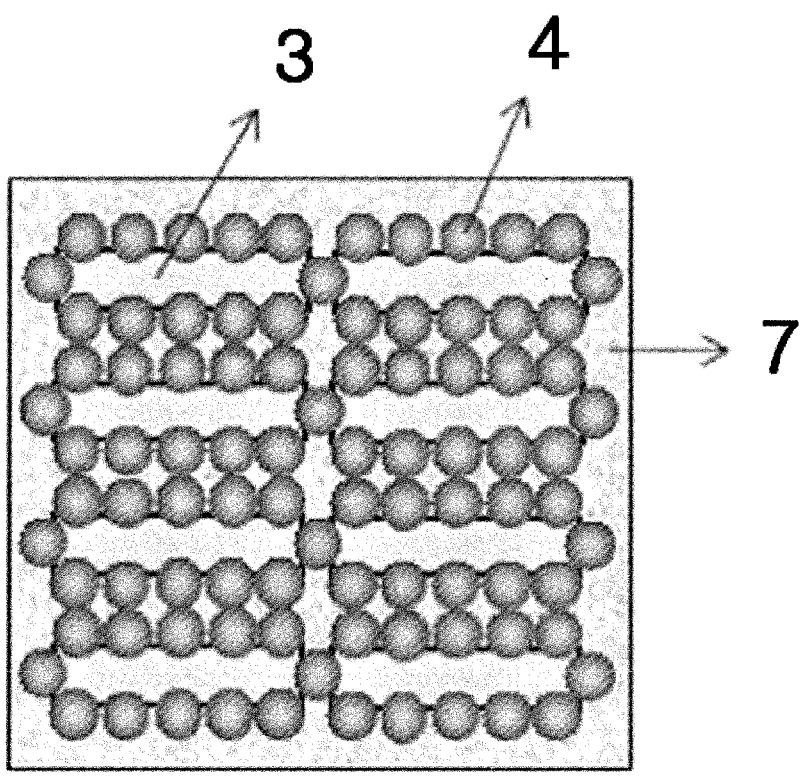
FIG. 8 is a mimetic diagram of an exemplary composite film including multifunctional thermal conducting and/or radiating particles, each having a plate-like core particle and a signal-layered shell.

The composite film may further include thermal conductive particles each having a micro size or less (see FIG. 4).

The organic binder may include at least one selected from a group consisting of thermosetting resin, plasticizer and cohesive resin, and be included by 5 to 90 volume % of the multifunctional thermal conducting and/or radiating particle or the composite array.

The composite film may be porous or dense.

A method for fabricating a multifunctional thermal conducting and/or radiating particle composed of a core and a shell according to this specification may be configured to mix a core particle having lower thermal conductivity than that of each particle included in the shell, with high-thermal conductive particles each having high thermal conductivity than that of the core particle, and bind (bond) the high-thermal conductive particles onto the surface of the core particle to create the shell. The high-thermal conductive particles may be included by 5 to 60 volume % of the core particle.

The binding (or bonding) may be executed by a dry fabricating method, in which collision between the core particle and the high-thermal conductive particles are induced to physically bind the high-thermal conductive particles onto the surface of the core particle, or a wet fabricating method, in which a pyrolysis is induced to chemically bind the high-thermal conductive particles onto the surface of the core particle.

The binding may be configured to obtain a multifunctional thermal conducting and/or radiating particle slurry that the high-thermal conductive particles are bound to the surface of the core particle by dissolving the core particle and the high-thermal conductive particles in distilled water, and adding ammonia water or caustic soda water in the particles-dissolved solution with stirring the same, and the method may further include separating the multifunctional thermal conducting and/or radiating particle from the slurry to be dried, or putting the slurry in a reaction tub, charging supercritical carbon dioxide fluid at high temperature to be cooled and dried to obtain a reaction product, and thermally treating the reaction product at high temperature.

Also, the multifunctional thermal conducting and/or radiating particle and/or the composite array may be mixed with an organic binder to fabricate a composite film.

This specification discloses a method for forming a multifunctional thermal conducting and/or radiating particle or composite array having a structure of enhancing a contact between high-thermal conductive media by formation of a shell, which includes high-thermal conductive particles each having an interface, on a surface of a core including a core particle formed of metal, ceramic, plastic or the like having relatively low thermal conductivity.

The multifunctional thermal conducting and/or radiating particle or the composite array may have multifunctionalities, such as electromagnetic wave absorbing property, flame retardency, antistatic property, insulating property, thermal resistance, electrical conductivity and the like, as well as the basic thermal conductivity. Those multifunctional thermal conducting and/or radiating particle or the composite array may be mixed with a polymer binder, such as silicon, epoxy or the like, to be fabricated in form of a performance-enhanced multifunctional thermal conducting and/or radiating film, a master batch or a three-dimensional array (structure), which may be used as various types of multifunctional thermal conducting and/or radiating substances or components.

EXAMPLE

Hereinafter, this specification will be described in more detail with reference to the following examples. Here, those examples are merely illustrative and should not be construed as limiting the present disclosure.

Examples 1 to 7

50 g of Fe—Cr powders having an electromagnetic wave absorbing property and aluminum nitrate, which was weighted such that alumina was mixed therein as much as 5 to 60 volume % of the Fe—Cr powders, were dissolved in distilled water to be stirred with an impeller. Ammonia water or caustic soda water in concentration of 0.1 mol/L was dropped into the obtained solution to prepare a slurry having a precipitate formed therein. The slurry was processed by gravimetric sedimentation or centrifugation and dried, followed by thermal treatment at 1200° C. for an hour, thereby fabricating a multifunctional thermal conducting and/or radiating particle or composite array.

The multifunctional thermal conducting and/or radiating particle or composite array was mixed with an organic binder, such as silicon, epoxy or the like. The mixture was kneaded such that the organic binder was taken by 5 to 90 volume % of a whole composite film, thereby fabricating a sheet-like composite film.

Examples 8 to 18

A slurry containing a precipitate, which was prepared by the method as in Example 1, was put in a reaction tub. Supercritical carbon dioxide fluid was charged in the tub with increasing temperature up to 150° C., and maintained for 2 hours in that state. The fluid-charged slurry was cooled and dried to obtain a reaction product. The reaction product was thermally treated at 800° C. for an hour under argon atmosphere, and cooled to create a functional thermal conducting and/or radiating particle or array. Such functional thermal conducting and/or radiating particle or array was used for preparing a composite film.

Examples 19 to 22

At the same ratio as in Example 1, 8 g of Fe—Cr powders and alumina, which was weighted to be included as much as 5 to 60 volume % of the Fe—Cr powders, were put in a dry coating device (NOB-130, Hosogawa Micron Co. Ltd., Japan) to be maintained for 3 minutes at 3,000 rpm, thereby creating a functional thermal conducting and/or radiating particle or array, which was then used for preparing a composite film.

Comparative Examples 1 and 2

At the same ratio as in Example 1, Fe—Cr powders and alumina, which was weighted to be included as much as 5 to 60 volume % of the Fe—Cr powders, were mixed with distilled water. The mixture was poured in a ball mill to be dispersed and stirred for 12 hours, followed by drying, thereby obtaining mixed powders. Such mixed powders were processed into a form of sheet according to the above method, thereby fabricating a film.

The following table 1 shows measurement results of composition ratios and thermal conductivities of the films fabricated by those examples and comparative examples.

TABLE 1

| | Core-shell volume ratio | Content of multifunctional particle in composite film (volume %) | Thermal conductivity (W/m · K) |
|---|---|---|---|
| Example 1 | 60:40 | 40 | 0.8 |
| Example 2 | 60:40 | 45 | 1.1 |
| Example 3 | 60:40 | 50 | 1.1 |
| Example 4 | 60:40 | 55 | 1.6 |
| Example 5 | 60:40 | 60 | 1.9 |
| Example 6 | 80:20 | 55 | 1.4 |
| Example 7 | 70:30 | 55 | 1.5 |
| Example 8 | 60:40 | 50 | 2.2 |
| Example 9 | 60:40 | 55 | 2.3 |
| Example 10 | 60:40 | 60 | 2.8 |
| Example 11 | 60:40 | 65 | 3.2 |
| Example 12 | 60:40 | 70 | 3.4 |
| Example 13 | 60:40 | 75 | 4.5 |
| Example 14 | 60:40 | 80 | 4.4 |
| Example 15 | 95:5 | 60 | 3.1 |
| Example 16 | 90:10 | 60 | 3.3 |
| Example 17 | 85:15 | 60 | 3.5 |
| Example 18 | 80:20 | 60 | 3.8 |
| Example 19 | 95:5 | 70 | 2.0 |
| Example 20 | 90:10 | 70 | 2.2 |
| Example 21 | 85:15 | 70 | 2.5 |
| Example 22 | 80:20 | 70 | 2.6 |
| Comparative Example 1 | 60:40 | 60 | 1.7 |
| Comparative Example 2 | 70:30 | 60 | 1.4 |

Comparing Comparative Examples with Examples 15-18, under the same particle content in the film (i.e., 60 volume %), relatively extremely low thermal conductivities were observable even if the rates (contents) of the thermal conductive powders (corresponding to the shell of this specification) of Comparative Examples 1 and 2 were 40 and 30, which were even higher than those of the shells (5~20) containing the high-thermal conductive particles fabricated in Examples 15 to 18.

It can be confirmed that higher thermal conductivity can be exhibited from the composite film including the multifunctional thermal conducting and/or radiating particles or composite arrays, in each of which the shell including high-thermal conductive particles is formed on the surface of the core including the functional core particle as shown in the present invention, compared with the film merely including functional particles and high-thermal conductive particles as can be seen in Comparative Examples 1 and 2.

Figure 14:
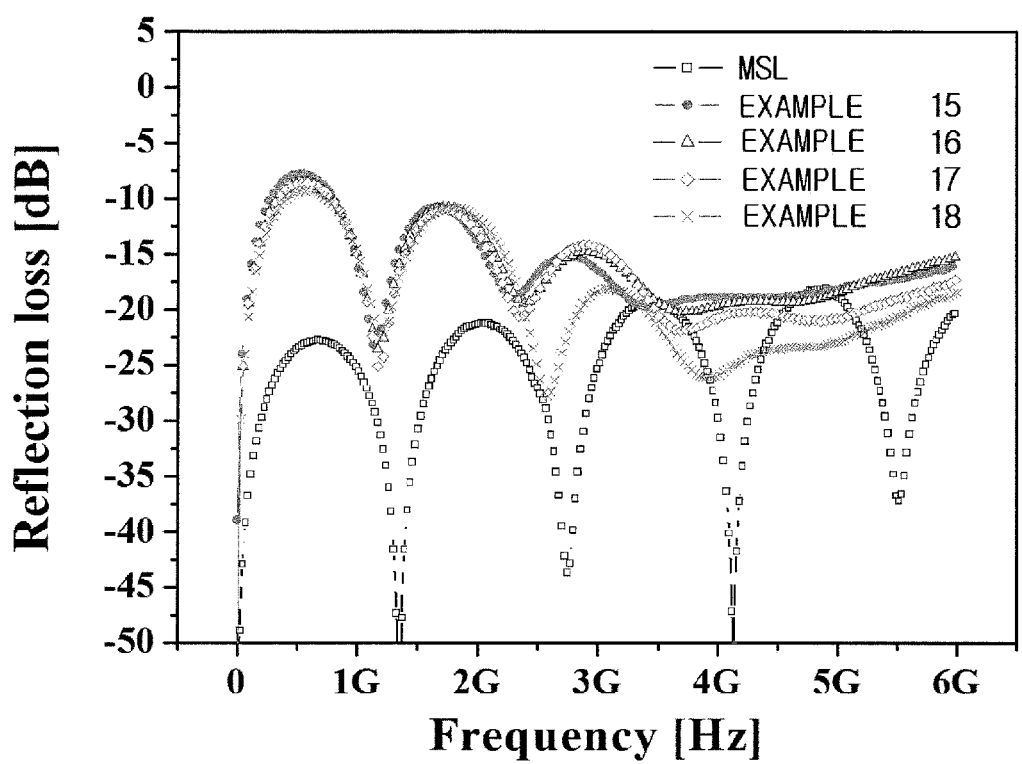
FIG. 14 is a graph showing results of a reflection loss test for composite films fabricated in Examples 15 to 18, according to a microstrip line (MSL) technology.
Figure 15:
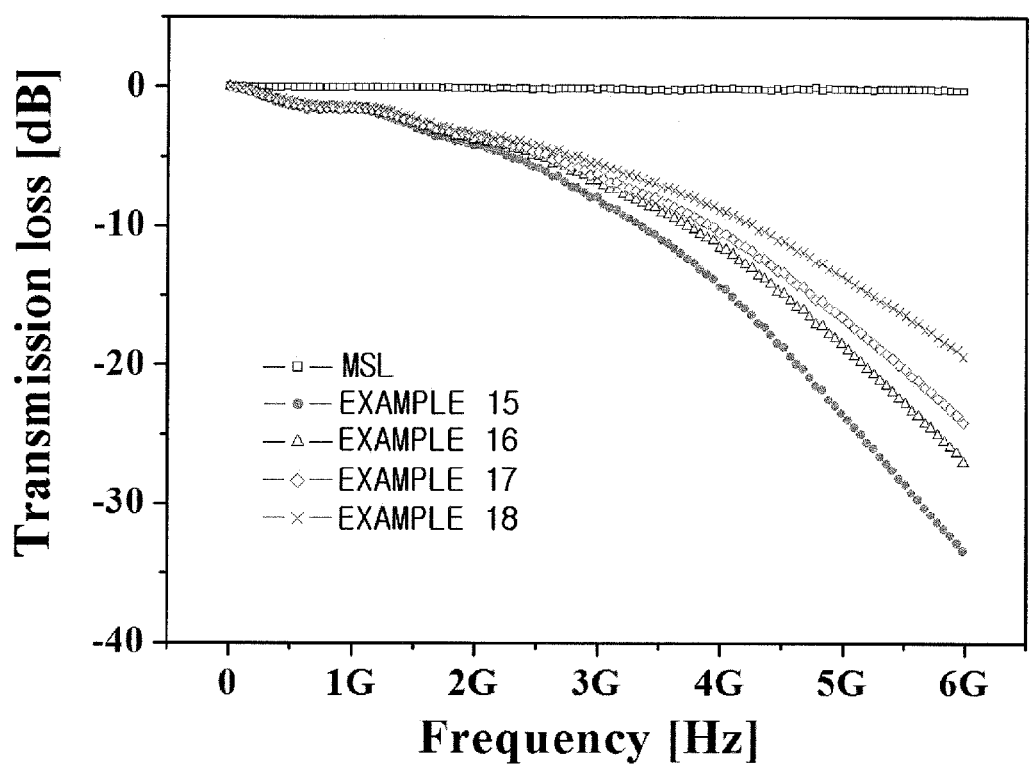
FIG. 15 is a graph showing results of a transmission loss test for the composite films fabricated in Examples 15 to 18, according to the microstrip line (MSL) technology.

FIGS. 14 and 15 are graphs showing measurement results of reflection loss and transmission loss tests for the composite films fabricated in Examples 15 to 18 according to a microstrip line (MSL) technology.

As shown in the measurement results of the reflection loss and the transmission loss of FIGS. 14 and 15, those composite films exhibit the electromagnetic wave absorbing properties. Hence, it can be understood that the composite films have a dual function of electromagnetic wave absorbing property and thermal conducting and/or radiating property.

Figure 16:
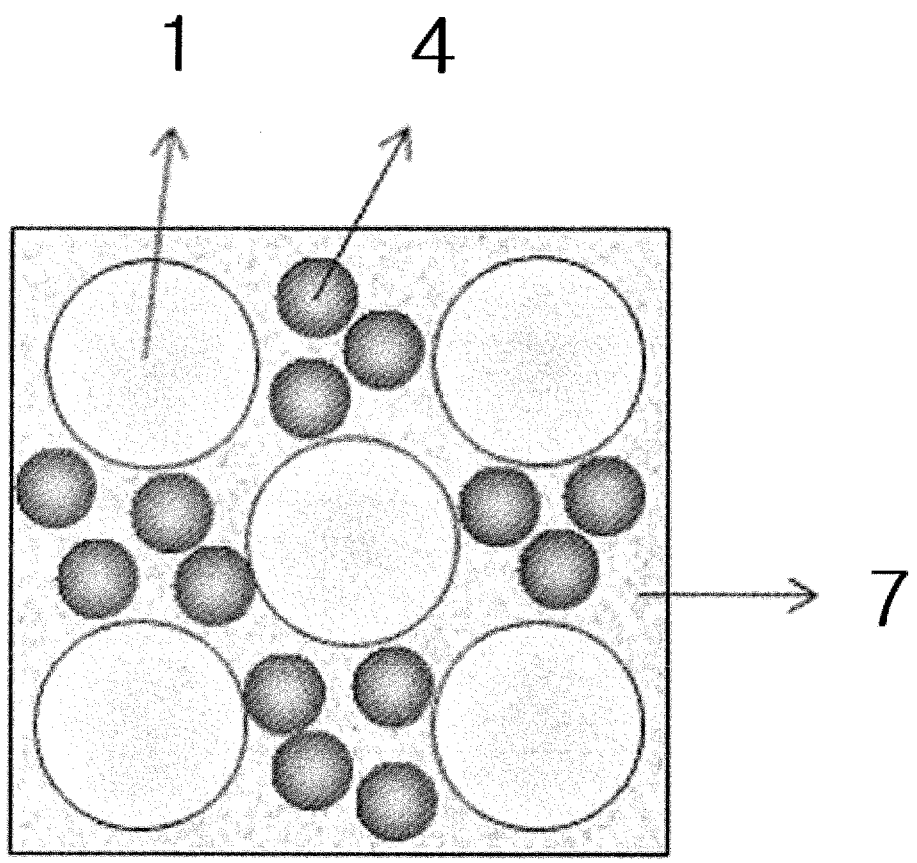
FIG. 16 is a mimetic diagram of a film merely having functional particles and thermal conductive particles according to Comparative Examples.

FIG. 16 is a mimetic diagram of a film merely including functional particles and high-thermal conductive particles of Comparative Examples according to the related art.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or to equivalents of such metes and bounds are therefore intended to be embraced by the appended claims.

BRIEF DESCRIPTION OF REFERENCE NUMERALS

1: core particle (spherical shape)
2: shell
3: core particle (plate-like shape)
4: high-thermal conductive particle
5: thermal conductive seed or high-thermal conductive ultrafine particle
6: composite array
7: organic binder
8: thermal conductive particle with micro size or less

What is claimed is:

1. A multifunctional thermal conducting and/or radiating particle composed of a core and a shell, comprising:
a core including a core particle having thermal conductivity lower than that of a particle included in the shell; and
a shell including high-thermal conductive particles having thermal conductivity higher than that of the core particle,
wherein the shell is 5~60 volume % of the core, and a diameter of the core is 50~90% of a diameter of the whole multifunctional thermal conducting and/or radiating particle, and
wherein the multifunctional thermal conducting and/or radiating particle has a diameter of 5.5 μm or less.

2. The particle of claim 1, wherein the core particle is formed of at least one selected from a group consisting of metal, ceramic and plastic.

3. The particle of claim 1, wherein the core has at least one shape selected from a group consisting of a plate-like shape, a spherical shape, a needle-like shape and a granular shape.

4. The particle of claim 1, wherein the core particle has at least one property selected from a group consisting of electromagnetic wave absorbing property, flame retardancy, antistatic property, insulating property, thermal resistance and electrical conductivity.

5. The particle of claim 4, wherein the core particle having the electromagnetic wave absorbing property is a functional particle formed of at least one selected from a group consisting of magnetic alloy, thermal magnetic ceramic, ferrite and conductive polymer.

6. The particle of claim 1, wherein the shell further includes thermal conductive seeds or high-thermal conductive ultrafine particles.

7. The particle of claim 1, wherein the shell including the high-thermal conductive particles includes a coating layer.

8. The particle of claim 1, wherein the shell includes a single layer composed of the high-thermal conductive particles.

9. A composite array formed by a mass of multifunctional thermal conducting and/or radiating particles;
wherein the multifunctional thermal conducting and/or radiating particle is composed of a core and a shell, comprising:
a core including a core particle having thermal conductivity lower than that of a particle included in the shell; and
a shell including high-thermal conductive particles having thermal conductivity higher than that of the core particle,
wherein the shell is 5~60 volume % of the core, and a diameter of the core is 50~90% of a diameter of the whole multifunctional thermal conducting and/or radiating particle, and
wherein the multifunctional thermal conducting and/or radiating particle has a diameter of 5.5 μm or less.

10. A composite film comprising one selected from a group of multifunctional thermal conducting and/or radiating particles, composite arrays, an organic binder, or a combination thereof;
wherein the multifunctional thermal conducting and/or radiating particle is composed of a core and a shell comprising:
a core including a core particle having thermal conductivity lower than that of a particle included in the shell; and
a shell including high-thermal conductive particles having thermal conductivity higher than that of the core particle;
wherein the composite array is formed by a mass of the multifunctional thermal conducting and/or radiating particles,
wherein the shell is 5~60 volume % of the core, and a diameter of the core is 50~90% of a diameter of the whole multifunctional thermal conducting and/or radiating particle, and
wherein the multifunctional thermal conducting and/or radiating particle has a diameter of 5.5 μm or less.

11. The composite film of claim 10, further comprising thermal conductive particles each having a micro size or less.

12. The composite film of claim 10, wherein the organic binder contains at least one selected from a group consisting of thermosetting resin, plasticizer and cohesive resin.

13. The composite film of claim 10, wherein the organic binder is included in 5 to 90 volume % of the multifunctional thermal conducting and/or radiating particles or the composite arrays.

14. The composite film of claim 10, wherein the composite film is porous or dense.

15. The composite array of claim 9, wherein the core has at least one shape selected from a group consisting of a plate-like shape, a spherical shape, a needle-like shape and a granular shape.

* * * * *